Patented Dec. 21, 1926.

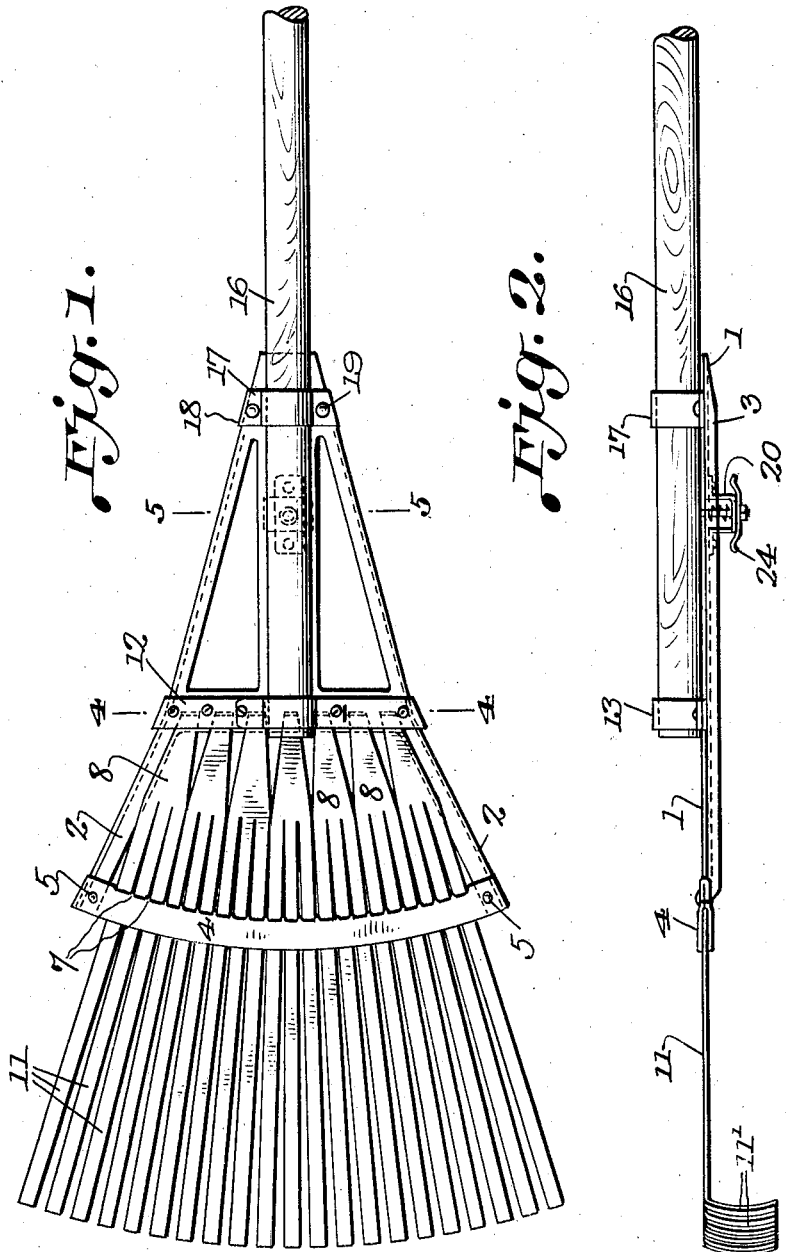

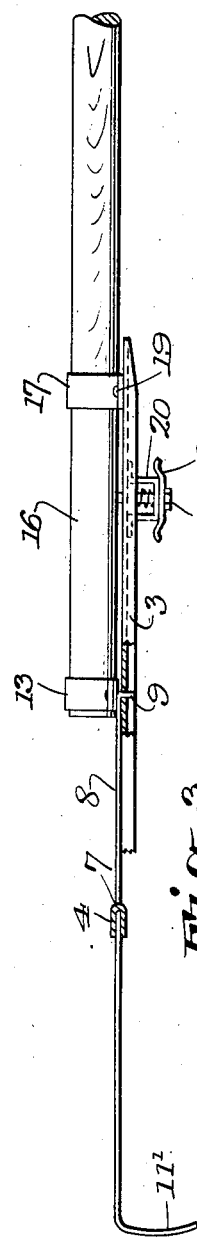

1,611,488

UNITED STATES PATENT OFFICE.

WENCESLAUS G. ROCQUIN AND CAMILLE J. ROCQUIN, OF NEW ORLEANS, LOUISIANA.

GARDEN RAKE.

Application filed May 22, 1925. Serial No. 32,069.

This invention relates to rakes of the type in which the teeth are detachable in order that a broken tooth may be readily repaired. It has for an object the provision of means for holding the teeth firmly in position but allowing detachment thereof when desired.

A further object of the invention is to provide readily releasable means for permitting the removal of the hand'e from the body of the rake.

A still further object is the construction of a rake in which all parts except the handle may be readily stamped from sheet metal, thus enabling quantity production thereof at a relatively low cost.

Further objects will be apparent from the following detailed description and appended claim.

In the drawings:

Figure 1 is a top plan view of the rake.

Figure 2 is a side elevation thereof.

Figure 3 is a longitudinal section with parts in e'evation.

Figure 4 is a section on the line 4—4 of Figure 1.

Figure 5 is a section on the line 5—5 of Figure 1.

Figure 6 is a perspective view of the main frame or body element and portions of the fastening means.

The frame or body 1 of the rake is of the general form shown in Figure 6 and has at the broad end thereof projecting arms 2 which are inclined outwardly at a somewhat greater angle than are the sides of the body 1. The sides of the body 1 and projecting arms 2 are provided with a flange 3. The holding and spacing means 4 for the tines of the rake is arc shaped in form and has its ends attached by screws or bolts 5 which pass through holes 6 in the ends of the arms 2. The flange 3 at the extreme ends of the arms 2 may be cut off or bent under upon the bolts 5 after the member 4 is attached thereto. The arc shaped member 4 is formed by folding a frame piece of sheet metal upon itself into substantially parallel plates, the web portion 7 which connects these plates being cut away to allow the tines of the rake to pass therethrough as hereinafter described.

The tines are preferably formed from strips of sheet metal 8 which have at one end downturned portions 9 which fit through openings 10 in the body member 1. Each portion 8 is divided by longitudinal slits which extend from the outer end up to a relatively short distance from the downturned end 9. The number of slits employed may be varied as desired, but in the present construction each part 8 is shown as being divided into three tines 11. Each of these tines passes through a cut-out portion in the web 7 of the holding member 4 and is therefore clamped by this member. The outer ends 11' of the tines 11 are turned downward to form prongs.

Overlying the inner ends 9 of the members 8 is a strap 12 and above this, near its central portion is a loop member 13 having ears 14. Screws or bolts 15 pass through the ears 14 through the strap member 12 and through the body member 1, thus serving to hold the parts together. Near its end the strap member 12 is provided with additional screws or bolts which pass through the same and through the body portion 1. One end of the handle 16 fits in the arched portion 14 of the strap member and at the other end of the body member there is provided a second arched portion 17 having ears 18 that are fastened to the body member 1 by bolts 19. This strap member overlies the handle and holds it firmly in position.

In order to prevent the handle from accidental displacement, there is provided on the under side of the body 1 at a point between the strap members 13 and 17, a U-shaped member 20 which is fast to the body portion in any desired manner. A bolt 21 slides through the base portion of this U-shaped member and through the frame member 1. At its outer end this bolt is provided with a nut 22 and at its inner end with a projection 23. These prevent accidental removal of the bolt. Between the base of the U-shaped member 20 and the nut 22 is placed a finger piece 24 through which said bolt also passes. Surrounding the bolt and bearing at one end against the base of the U-shaped member 20 and at its other end against a nut 26 fast on the bolt is a spring 25. This spring normally tends to force the projection 23 into a correspondingly shaped depression in the handle, thus holding the handle against accidental displacement. When it is desired to remove the handle, the finger piece 24 is grasped and the bolt 21 moved to the dotted line position of Figure 5, thus releasing the projection 23 from the handle and allowing the free removal of the latter.

It will be seen from the above that substantially all parts of the rake, with the exception of the handle member, can be stamped from sheet metal and that if a tine becomes broken the member 8 carrying the same can be removed by loosening one or more of the screws or bolts which hold the strap 12 in position. The handle is also readily removable whenever it is desired to pack the device for shipment or storage or whenever the handle is broken.

It is obvious that various detail changes in the precise construction illustrated may be made without in any way departing from the spirit of the invention, which is to be regarded as limited only by the scope of the appended claim.

We claim as our invention:

In a rake, the combination with a frame member having a transverse series of openings, arms extending substantially longitudinally therefrom, a plurality of longitudinally extending tines having their inner ends projecting through the openings in the frame and having their outer ends projecting beyond said arms, means for retaining the inner ends of said tines in said openings, and a transversely disposed guide rigidly secured to said arms intermediate the opposite ends of the tines for holding the inner portions of the tines against lateral and vertical movements relative to the frame.

In testimony whereof, we have hereunto subscribed our names.

WENCESLAUS G. ROCQUIN.
CAMILLE J. ROCQUIN.